United States Patent [19]

Samuelson

[11] Patent Number: 5,456,799
[45] Date of Patent: Oct. 10, 1995

[54] METHOD FOR CONTROLLING ACTIVATION OF LIGNOCELLULOSIC MATERIAL IN THE PRESENCE OF A NITRATE CONTAINING LIQUID

[75] Inventor: Hans O. Samuelson, Gothenburg, Sweden

[73] Assignee: Mo Och Domsjo Aktiebolag, Ornskoldsvik, Sweden

[21] Appl. No.: 229,116

[22] Filed: Apr. 12, 1994

Related U.S. Application Data

[63] Continuation of Ser. No. 987,253, Dec. 7, 1992, abandoned, which is a continuation of Ser. No. 720,836, filed as PCT SE90/00036, Jan. 16, 1990, abandoned.

[30] Foreign Application Priority Data

Jan. 19, 1989 [SE] Sweden ..................... 890017

[51] Int. Cl.$^6$ .................. D21C 3/16; D21C 9/147
[52] U.S. Cl. .................. 162/62; 162/49; 162/65; 162/81
[58] Field of Search .................. 162/49, 61, 62, 162/65, 81

[56] References Cited

U.S. PATENT DOCUMENTS 3,888,726 6/1975 Hultman ..................... 162/62
4,725,335 2/1988 Samuelson ..................... 162/81
4,897,156 1/1990 Samuelson ..................... 162/81

FOREIGN PATENT DOCUMENTS 448006 1/1987 Sweden.

Primary Examiner—Steve Alvo
Attorney, Agent, or Firm—Sughrue, Mion, Zinn, Macpeak & Seas

[57] ABSTRACT

The method solves the problem of delignifying technical cellulose pulp in a selective manner which will result in very low residual contents of lignin in the pulp and a correspondingly high quantity of lignin dissolved in spent liquors, which are recovered in the chemical recovery system of the pulp mill. The method comprises activating liquid-containing lignocellulosic material in the presence of nitrate with a gas that contains nitrogen dioxide, followed by the alkaline delignification of the lignocellulosic material, and measuring the acidity of the liquid accompanying the material on at least one occasion during the activation. The method is characterized in that the acidity of the liquid is measured subsequent to bringing the time derivative of the nitrate concentration of the liquid, expressed as millimols per liter of liquid per minute, to a level beneath +0.2, and by using the measured acidity value to establish the optimum amount of mineral acid for continuation and termination of the activation, and by charging the whole of this quantity or a part of this quantity of mineral acid to the lignocellulosic material.

12 Claims, No Drawings

METHOD FOR CONTROLLING ACTIVATION OF LIGNOCELLULOSIC MATERIAL IN THE PRESENCE OF A NITRATE CONTAINING LIQUID

This is a Continuation of application Ser. No. 07/987,253 filed Dec. 7, 1992, now abandoned, which is a Continuation of application Ser. No. 07/720,836 filed Aug. 7, 1991, now abandoned.

TECHNICAL FIELD

The present invention relates to a method in which lignocellulosic material in fibre form is activated with a gas which contains nitrogen dioxide, and subsequently the lignocelluosic material is delignified in the presence of alkali. The invention is suitable primarily for application with lignocellulosic material in the form of chemically produced cellulose pulp, and particularly, but not exclusively, alkali digested pulp. Examples of alkali digested pulps are sulphate pulp, polysulphide pulp and soda pulp. The term soda pulp includes those pulps digested with the aid of sodium hydroxide as the cooking chemical, in the presence of different additives. Examples of such additives are redox catalysts, such as anthraquinone. The invention can also be applied to other chemical cellulose pulps, for instance sulphite pulp. A particular advantage is afforded when cellulose pulp is treated in accordance with the invention after the lignocellulosic material has been digested, washed and optionally screened. When treating the lignocellulosic material in accordance with the invention, the process of delignification commenced during the cook is continued thereafter, and is often referred to as delignifying bleaching, or simply bleaching. Although it is particularly advantageous to apply the invention at the aforesaid position in the cellulose pulp manufacturing chain, the lignocellulosic material may be treated in one or more further stages (for instance bleaching stages) in addition to the aforesaid stages, prior to treating the lignocellulosic material in accordance with the present invention.

THE PRESENT STANDPOINT OF TECHNIQUES

It has been found that when an unbleached cellulose pulp is activated with nitrogen dioxide ($NO_2$) and oxygen ($O_2$). Alkaline delignification, for instance in the presence of oxygen gas, referred to as oxygen-gas bleaching, can be carried to a farther extent than is possible when the pulp is bleached with oxygen gas directly, without first activating the cellulose pulp. The spent liquors deriving from both the activation and the oxygen-gas bleaching can be recovered and burned together with the spent cooking liquor. This results in a pronounced decrease in the release of organic compounds to the recipient, particularly when bleaching sulphate pulp and such a sulphite pulp, which is digested with sodium as base.

The extent to which the alkaline delignification of cellulose pulp can be driven without a given viscosity of the cellulose pulp (for instance 950 $dm^3/kg$ measured in accordance with SCAN-C15:62) being passed depends on the parameters applied during the activation of the cellulose pulp. It is important that both hydrogen ions ($H^+$) and nitrate ions ($NO_3^-$) are present during the activation, i.e. while treating cellulose pulp in the presence of nitrogen dioxide. This is taught by the two Swedish Patent Specifications 8105552-7 (448 006) and 8206859-4 (434 283).

However, it is not solely the presence of these ions as such which has significance on the course taken by the activation of the cellulose pulp. It has been found that a surprisingly good result is obtained if the activation is divided into two stages, which is achieved by using two reactors or reaction chambers during the activation, a first reactor of smaller volume, called an initial reaction chamber, and a second reactor of larger volume, called the regeneration chamber. This arrangement of apparatus is described in more detail in the Swedish Patent Specification 8300388-9 (451 149).

SUMMARY OF THE INVENTION

Technical problems

In order to achieve high selectivity subsequent to the alkaline delignification of the cellulose pulp, it has previously been necessary to dilute the cellulose pulp to a very low pulp consistency during the activation of the pulp. Furthermore, the result achieved by activating the cellulose pulp is counteracted to a significant extent by the varying quantities of spent cooking liquor and/or spent bleaching liquor which unavoidably remain in the cellulose pulp subsequent to washing and optional screening of the pulp in a closed system, in the manufacture of chemical pulp on a technical (full) scale.

Solution

The present invention provides a solution to these problems and relates to a method in the manufacture of cellulose pulp, wherein liquid-containing lignocellulosic material is activated with a gas that contains nitrogen dioxide ($NO_2$) in the presence of nitrate, followed by alkaline delignification of the lignocellulosic material, and wherein the acidity of the liquid accompanying the lignocellulosic material is measured on at least one occasion during the activation, characterized by, measuring the acidity subsequent to bringing the time derivative of the nitrate concentration of the liquid, expressed as millimols per liter of liquid per minute, to a value beneath +0.2 and by using the measured acidity value to establish optimum mineral acid quantities for continuing and terminating the activation and by supplying the whole of this amount of mineral acid, or part of said amount to the lignocellulosic material.

In order to enable activation of the lignocellulosic material to take place at least one oxide of nitrogen must be present. By active oxide of nitrogen is meant primarily nitrogen oxides in the oxidation states +III, for instance dinitrogen trioxide ($N_2O_3$) and +IV, for instance nitrogen dioxide ($NO_2$) and dinitrogentetroxide ($N_2O_4$). Nitrous acid ($HNO_2$) is an oxide of nitrogen. Nitrogen monoxide (NO) is a conditionally active oxide of nitrogen.

The additive chemical chosen is primarily nitrogen dioxide ($NO_2$) or dinitrogen tetroxide ($N_2O_4$). Equally good results are obtained when the additive chemical is nitrogen monoxide (NO) and oxygen gas, which react to form nitrogen dioxide in accordance with the formula $$2NO + O_2 \rightarrow 2NO_2$$

Of course, nitrogen dioxide and nitrogen monoxide may be added in mixture, optionally supplemented with oxygen gas.

A larger or smaller part of, for instance, the nitrogen dioxide addition can be replaced with an addition of nitric acid ($HNO_3$).

The amount of added chemical, e.g. in the form of nitrogen dioxide, is determined by several factors, and will normally lie within the range of 0.5–4%, calculated on the bone-dry weight of lignocellulosic material. This amount is primarily determined on the lignin content of the lignocellulosic material. Furthermore, attention must be paid to the extent to which the lignocellulosic material is contaminated, i.e. the amount of dissolved organic substances deriving from the spent cooking liquor and/or the spent bleaching liquor which accompanies the lignocellulosic material into the activation stage.

A large number of chemical reactions take place during the activation stage. Only the following reactions will be mentioned here:

$$N_2O_4 + H_2O \rightarrow HNO_2 + HNO_3$$

$$HNO_3 \rightleftharpoons H^+ + NO_3^-$$

In addition to the reaction of nitrogen dioxide or dinitrogen tetroxide in accordance with the above, part of the nitrogen dioxide is present in the gas phase.

As a result of adding the aforesaid chemicals the liquid phase will, of natural necessity, include both nitrate ions and hydrogen ions. The concentration of hydrogen ions will also depend on the level of alkalinity of the pulp introduced to the activation stage.

If the nitrate content of the liquid is determined during the initial stage of the activation at selected time intervals by means of ion chromatography or some equivalent measuring process and the numeric value of the time derivative, expressed as millimol of nitrate per liter of liquid per minute, is determined on the basis of the measurement values obtained either graphically or in accordance with some numerical method it will be found that the time derivative will have a high positive value, e.g. between +10 and +1000, during an initial stage of the activation.

This value will fall as the activation proceeds, if no nitrate or no nitrate producing chemical is added during this period. If such an addition is made to the system, the value will increase temporarily and then fall. After a given time period, which in turn is dependent on different process conditions, the value will fall towards zero, pass zero and become negative.

It is found that when the time derivative has fallen to a sufficiently low value, i.e. to +0.2 or therebeneath, the initial reactions have declined and/or been stabilized. This takes place irrespective of the extent to which the lignocellulosic material is contaminated, i.e. irrespective of the varying amounts of e.g., spent cooking liquor and/or spent bleaching liquor in the pulp suspension. Comprehensive trials have revealed that if the acidity of the liquid phase is determined in this stage of the activation process, the measuring value obtained can be used as a basis for establishing the amount of mineral acid which shall be introduced to the lignocellulosic material in order to enable the activation to be continued and terminated in an optimal manner, resulting in very thorough delignification of the lignocellulosic material in the following alkaline delignification stage, without falling beneath a given critical lowest viscosity level.

On the basis of such trials it is possible to establish a regression relationship between optimum quantities of mineral acid and the measured acidity values when activating similar types of lignocellulosic material, when using the same addition of nitrogen dioxide or equivalent chemicals, when applying the same time and temperature schedules, and when carrying out the process in the same apparatus. By similar types of lignocellulosic material is also meant that the pulp consistency is approximately the same. Subsequent to establishing such a regression relationship, this relationship is then used to control and terminate the prevailing activation process, by reading the established relationship, e.g. in the form of a table, and determining the mineral acid addition which corresponds to the newly measured value of the acidity of the liquid.

The acidity of the liquid is determined at the same numerical value on the time derivative of the nitrate concentration and the analysis is carried out by the same method as that used in the trials on which the relevant regression relationship is based.

The meaning of acidity in this connection and proposals for appropriate analysis methods are presented further on in the description.

In the aforegoing there has been described how to establish the mineral acid addition which will result in an optimum activation result. It is fully possible to introduce this acid quantity to the lignocellulosic material in one single batch. However, preferably only a part of this mineral acid quantity, e.g. 60–90%, is introduced to the lignocellulosic material and the acidity of the liquid is again determined at a later point in time. An additional, lower quantity of mineral acid which when introduced will result in optimum activation is determined on the basis of another regression relationship established in precisely this stage in the activation of the lignocellulosic material. This addition is then made. This will further ensure that the final result desired will be achieved in all separate activations. In other words it is more beneficial to use a careful strategy with regard to the amount of mineral acid that shall be introduced to the lignocellulosic material than to introduce a large quantity of mineral acid at one occasion since this large quantity may result in overcharging. The aforedescribed method of procedure can therefore be repeated a third time, and so on.

The mineral acid introduced is normally nitric acid, which affords advantages over other mineral acids. The acid supply is effected in the form of process extrinsic nitric acid and/or nitric acid present in spent liquor from a previous lignocellulosic material activating process. (By process extrinsic is meant acid which is not produced by the process itself.)

Other mineral acids may be used, however. One example is sulphuric acid ($H_2SO_4$), which is cheaper than process extrinsic nitric acid. Sulphuric acid can be used advantageously when the liquid accompanying the lignocellulosic material has a high nitrate concentration, for instance due to a high charge of nitrogen dioxide and/or other nitrogen compounds, such as nitrous acid and nitrogen monoxide, which give rise to nitrates. Process extrinsic acids normally consist of commercial products, for instance 65% nitric acid or 97% sulphuric acid. Mixtures of these acids can also be used. The liquid supplied to the lignocellulosic material normally comprises a mixture of process extrinsic acid and spent liquor deriving from the previous lignocellulosic material activating process. The spent liquor returned in this case will contain carboxylic acids of various types and acid strength, and normally also sulphate ions in addition to nitrate ions and hydrogen ions. The spent liquor will also contain a large number of other chemical compounds, the composition of which is highly complicated. The amount of mineral acid in the aforesaid mixture is obtained by adding the amount of process extrinsic acid and the acid content of the spent liquor, determined in accordance with some standard method, for instance potentiometric titration with sodium hydroxide to a pH of 3.5.

The following applies with respect to temperature and time during the activation. It is found that a risk of a strong attack on the carbohydrates prevails at the beginning of the activation process, i.e. immediately after that, e.g., nitrogen dioxide has been introduced to the lignocellulosic material. Consequently, a relatively low temperature is preferred, i.e.

within the range of 40°–80° C., during the initial stage of the activation. The choice of temperature is highly dependent on the pulp consistency during the inititial stage. This may be chosen, for instance, within the range of 10 to 35%. For the purpose of reducing the amount of contaminating organic substances which accompany the lignocellulosic material into the activating stage, a high pulp consistency is preferred, for instance 30% or higher. With pulp consistencies of this high value, the temperature is preferably selected in the lower half of the aforesaid temperature range, and conversely a high temperature can be selected if the pulp consistency is relatively low. The time can be, for instance, from less than 1 minute up to 30 minutes. Since, in accordance with the invention, at least one addition of liquid which contains mineral acid is always made during the activation, the pulp consistency will be lowered, for instance, to the interval 5–15%. During this stage of the activation it is advantageous to raise the temperature and to maintain a lowest temperature of 70° C. during a time period of at least 60 minutes. Temperatures of up to 100° C. and somewhat thereabove can be applied. Long time periods in this stage of the activation, designated the regeneration stage, for instance three hours within the temperature range of 85°–100° C. and still longer time periods within the temperature range 70°–85° C., contribute towards optimizing the activation and the result obtained therewith.

According to the invention, the activation stage can be carried out either without supplying an oxygen containing gas or with the supply of such gas, preferably oxygen gas. In the former case it is necessary to handle remaining nitrogen oxide in some way or another upon termination of the activation techniques for which are known to the art, whereas in the latter case it is preferred to supply oxygen gas at some point during the latter half of the activation time period.

With respect to the delignification of the lignocelluosic material subsequent to the activation this can be carried out in any manner whatsoever, provided that alkali is present. By alkali is meant any chemical which contains or which will result in hydroxide ions ($OH^-$). Conventional alkaline compounds are sodium hydroxide (NaOH), sodium carbonate ($Na_2CO_3$) and sodium hydrogencarbonate ($NaHCO_3$). The alkaline delignification can be carried out advantageously in the presence of oxygen gas in accordance with known techniques. Pulp consistency and oxygen gas pressure can be selected freely. A protector is also normally added during the oxygen gas bleaching process. It is also possible to reinforce the alkali delignification process with chemicals other than oxygen, for instance peroxide or hypochlorite.

Advantages

The present invention enables activation of the pulp to be controlled in a manner such as to obtain persistently far-reaching delignification of the pulp in the delignification following the activation, without a given viscosity of the cellulose pulp produced is passed even when the quantity of organic substances deriving from the cooking waste liquor and/or the bleaching waste liquor accompanying the lignocellulosic material into the activating stage varies widely during mutually different periods. The invention also affords the general Possibility of optimizing the activation, i.e. even when the amount of organic substances accompanying the lignocellulosic material is relatively constant. For reasons unknown, it is namely so that two lignocellulosic materials which appear to be similar and which contain similar quantities of accompanying organic substances during the activation and delignification carried out in accordance with prior art techniques will give rise to different results. These fluctuations in the results obtained are diminished when applying the present invention. Furthermore, an opportunity is given for a comparatively high pulp consistency to be maintained during the final stage of the activation. This results in a reduction in the amount of water handled in the final recovery system and also results in favourable heat economy. Furthermore, the volume of the activation apparatus is greatly reduced.

DESCRIPTION OF PREFERRED EMBODIMENT

Certain parts of the inventive method are described in more detail in the following while referring to alternative measures in connection therewith. A report is also given of batch trials carried out in laboratory apparatus, with the intention of simulating continuous handling of lignocellulosic material on a technical scale.

As beforementioned, ion chromatography is preferred when establishing the nitrate content of the liquid accompanying the lignocellulosic material. Classic analysis methods can also be applied, however. Should nitrate or nitrate generating substances be introduced during the activation within the short period of time in which the time derivative of the nitrate content is determined, these additions are discounted. The time derivative provides a measurement of the course taken by the chemical reactions during the time at which the time derivative is determined. As beforementioned, at the beginning of the activation the time derivative will fall from a high positive value down to zero and will thereafter become negative. The value, however, will again increase if the activation is allowed to continue for a sufficient length of time without any chemicals being added. The nitrate content of the liquid can be determined within the activation reactor. Analyses of liquid samples taken from the reactor, however, will provide more reliable results with methods known in the art.

The acidity of the liquid accompanying the lignocellulosic material can be determined in several ways. This will involve the determination of the hydrogen ion concentration in the liquid and/or the buffer capacity of the liquid. It is preferred to determine the acidity by titration of the hydrogen ions with alkali, for instance sodium hydroxide, to a given pH-value or given pH-values. 3.5 and 7.0 are examples of pH-values which can be applied as end points for, e.g., potentiometric titration of the liquid. A pH-electrode is immersed in the liquid, which normally has a pH within the interval 1–2. Sodium hydroxide is added until the pH has risen to 3.5 for instance. The recorded consumption value provides a measurement of the acidity of the liquid. Titration can then be continued to a pH, e.g., of 7.0 and a new value is read off. It is also possible to titrate the liquor directly to pH 7.0 and read off the consumed amount of solution. The measured values can be used as a basis of calculating the acidity of the liquid, either separately or together. As will be evident from the aforegoing potentiometric titration is preferred, since it can be carried out simply with commercially available apparatus and since the pH of the liquid is also determined at the same time. Other detection methods may also be used to determine the end point of the titration or other methods for measuring the alkali consumption can be used. Among those colorimetry, conductometry and calorimetry can be mentioned. A further method of determining the acidity of the liquid is to determine the pH of the liquid subsequent to bringing said liquid to a standard temperature, for instance 25° C. (which temperature is the temperature used when reporting the measured pH-values in this description). It is highly unusual, however, that measured pH-value alone will give a relevant measurement of the acidity of the liquid.

Theoretically, the acidity of the liquid can be determined either on site within the activation reactor or on liquid taken from the reactor. It is normally necessary to separate the liquid from the lignocellulosic material. At present, it is preferred to determine the acidity of the liquid externally of the reactor.

As previously mentioned, it is preferred to press the largest possible amount of liquid from the lignocellulosic material subsequent to washing and optionally screening the material, with the intention of reducing the amount of organic substances deriving from the spent cooking liquor and/or the spent bleaching liquor which contaminates the lignocellulosic material. Pulp consistencies of, e.g., 30% or thereabove are obtained as a result thereof. This results in problems with respect to the removal of samples from the liquid that accompanies the lignocellulosic material. However, liquid required for determining acidity can also be pressed from pulp of such high consistencies. If the quantity of liquid pressed from the pulp is too small for the purpose of analysis, the liquid can be diluted with a controlled quantity of distilled or deionised water. However, in order to overcome this problem, it is preferred to add a given quantity of liquid to the lignocellulosic material prior to taking a liquid sample for the purpose of determining the acidity. The liquid added will preferably contain mineral acid and, advantageously, also spent liquor deriving from an activation. The amount of mineral acid added to the lignocellulosic material in this respect shall be markedly less than the total amount of mineral acid required to achieve optimum activation of the lignocellulosic material. This liquid can be supplied to the lignocellulosic material immediately prior to or in conjunction with introducing the lignocellulosic material into the activation reactor, i.e. prior to introducing an active oxide of nitrogen, e.g. nitrogen dioxide, to said material. It is often advantageous to reverse the said order of addition. It can be beneficial, inter alia, due to among other things the price relationship between, e.g., nitrogen dioxide and process extrinsic nitric acid, to introduce nitric acid in large quantities and decrease the charge of nitrogen dioxide.

When proceeding in the above described manner no problem is experienced in removing a representative liquid sample for acid determination purposes.

If the liquid is highly contaminated in the manner previously mentioned, it is suitable to degas the liquid sample prior to analysis. Degasification can be effected by heating and/or evacuating and/or blowing with nitrogen gas.

On the whole it is important that sampling of the liquid and the analysis are carried out under standardized conditions. Furthermore, as previously mentioned, it is important that the method of analysis applied during the activation concerned is the same as the analysis methods applied to establish the aforedescribed regression relationship. If the same methods of analysis are not used on both of these occasions, it is necessary to ensure that the analysis result on the one occasion coincides and/or correlates with the analysis result of the other occasion.

When establishing the aforesaid regression relationship between optimum quantities of mineral acid (set point values) and the measured acidity values, the same apparatus is used as that used in the current activation of the lignocellulosic material in continuous production. Stirring of the lignocellulosic material and the gas volume of the reactor are examples of significant parameters relating to the apparatus. In the case of a continuously operating reactor, the gas velocity relative to the speed at which the lignocellulosic material is advanced affects the process.

The release of gas from, for instance, the first reactor in a preferred two-reactor system should be uniform and maintained at a controlled level of such low value that the partial pressures of active nitrogen oxides will not fall beneath given threshold values. These threshold values are probably interdependent and are influenced by a series of different factors in a manner not established. It has been established that the threshold values are high at low contents of nitrate ions and hydrogen ions in the liquid phase. Consequently, in these instances it is necessary to keep the initial stage short in time (and consequently the volume of the reactor low), meaning that the time lapse between the addition, e.g., of nitrogen dioxide and the addition of liquid containing mineral acid to the lignocellulosic material will be only some or a few minutes. If the production schedule is changed for some reason or other, including the design and operation of the apparatus used and the aforesaid other parameters, it is necessary to establish a new regression relationship when sufficiently reliable values are lacking from previous application of the method with the changed conditions.

The aforementioned laboratory trials will be described in more detail below in the form of working examples.

EXAMPLE 1

The following by way of introduction stated is valid for all of the trials carried out.

The trials were carried out in a glass reactor having a volume of 2200 ml. The glass reactor was rotated in a water bath and the temperature within the reactor was controlled by the temperature of the water bath. The charge of bone-dry cellulose pulp was 90 grams throughout. In the case of trials on this scale, it is impossible to take samples from the glass reactor, without disturbing the autocatalytic reactions that take place during the activation. One reason for this is that the composition of the gas phase will be unavoidably disturbed. Trials were carried out with a glass reactor having a volume five times larger than the aforesaid volume, but the problem remained. Consequently, trials were carried out in parallel and interrupted when samples of the treatment liquid were taken. The conditions were identical with the conditions under which the following trials were carried out, up to the time at which the glass reactor was cooled with icewater immediately prior to sampling. The reported values of the time derivatives of the nitrate concentration in the liquid and the acidity and pH have thus been determined in these separate trials.

In order to enable a lucid comparison to be made, the additions of water, nitrogen dioxide, nitric acid, sodium nitrate and, in certain trials, black liquor, were calculated on 1000 kg of bone-dry cellulose pulp.

Washed and screened pulp was taken from the softwood line of a sulphate pulp mill on mutually different occasions, for the purpose of establishing a regression relationship. The trials were carried out by activation and subsequent delignification of the pulp in precisely the same manner as that hereinafter described in detail. Pulps taken on different occasions from one and the same production line differed from one another primarily with respect to the following two conditions. The wood raw material from which the pulp was produced can vary, since different types of wood were mixed together. Certain variations in wood types occur. Variations will also occur, depending on whether the wood chips were produced from land stored and/or water stored wood and/or were in the form of surplus chips obtained from mutually different sawmills. The result of washing the pulp also varies at different time points. Thus, variations may occur in the total amount of organic substance accompanying the pulp into the activation stage and the relationship between organic substance deriving from the spent cooking liquor relative to organic substance deriving from, in this case, spent oxygen gas bleaching liquor.

Anyhow, samples were taken for the purpose of determining the acidity of liquid accompanying the pulp, subsequent to termination of the extremely rapid initial reactions that commence when nitrogen dioxide is introduced. The formation of nitrate is a main reaction among these initial reactions. The time at which samples were taken was selected so that nitrate was consumed at a somewhat higher rate than the rate at which nitrate was formed, more specifically when the time derivative of the nitrate concentration expressed as mmol per liter of liquid and minute had fallen to the value $-0.1$. In the case of the treatment schedule described below, this corresponded to a treatment time of 15 minutes. At this time point, an autocatalytic generation of the nitrogen oxides took place from present nitrate at significant speed. The reactions were reflected, inter alia, in the formation of nitrogen oxides and methanol, which were probably formed in consecutive reactions.

Various quantities of nitric acid were added to the pulp five minutes after taking the samples, and the activation process was continued in accordance with said schedule. The added quantity which was found to provide the best end result, in this case the lowest kappa number at an intrinsic viscosity of 950 dm$^3$/kg subsequent to the oxygen gas delignification carried out subsequent to the activation was noted and plotted against the acidity value.

The following Table 1 was established in this manner.

TABLE 1

| Acidity determined by titration to pH 3.5, mmol per liter liquid | Nitric acid charge (HNO$_3$) mol per 1000 kg bone-dry pulp Set point values |
| --- | --- |
| 10 | 500 |
| 15 | 380 |
| 20 | 290 |
| 25 | 200 |
| 30 | 125 |
| 35 | 10 |

Set point values corresponding to the measured acidity values deviating from the values aforegiven were obtained by interpolation.

Now the general part of the Examples is left and the separate trials are described in detail below.

Six trials are reported In the following. The first two trials were carried out in accordance with the invention with a washed and screened pulp taken from the aforesaid production line. Two reference trials were carried out with a similar pulp which had been taken from the same production line three hours later. Two further trials were carried out on this pulp in accordance with the invention.

The first pulp had a kappa number of 32.8, determined in accordance with SCAN-C1:59, and an intrinsic viscosity of 1211 dm$^3$/kg, determined in accordance with SCAN-C15:62. (These analyses methods have been used throughout all of the trials reported In this publication.) The pulp was pressed to a pulp consistency of 36%, with the intention of removing some of the amount of the organic substance remaining in the pulp subsequent to washing and screening the pulp in the pulp mill. The pulp was then supplied with waste liquor taken from an earlier activation experiment, such as to lower the pulp consistency to 12%. The nitrate ion content of the spent liquor was 0.24 mol per kilogram water. The temperature of the liquor was 80° C.

20 kg (435 gmols) of nitrogen dioxide were added for each 1000 kg of dry pulp, at said pulp consistency. A temperature of 80° C. was maintained. Several samples were taken sequentially from liquid separated from pulp at a time point 10 to 20 minutes after activation had commenced, and the nitrate concentration of the samples was determined by ion chromatography. The time derivative of the nitrate concentration, expressed as millimols per liter of liquid and minute, was found to be $-0.1$ at a treatment time of 15 minutes. On the basis of this, this time point was chosen for sampling the liquid for the purpose of determining its acidity. The acidity was determined by titrating the liquid potentiometrically with a sodium hydroxide solution to pH 3.5. The measurement showed a consumption of 25.3 mmols per liter. The pH-value of the liquid at a temperature of 25° C. was 1.7. Table 1 shows that this acidity corresponds to a charge (set point value) of 200 mols of nitric acid per 1000 kg bone-dry pulp. The charge comprised activation waste liquor, to which 65%-nitric acid was added in a quantity such that the total addition of mineral acid was equal to this set point value. The sodium hydroxide consumption when titrating potentiometrically to pH 3.5 was taken, in this case, as a measurement of the amount of mineral acid in the spent activation liquor. The spent liquor to which nitric acid was added was charged five minutes after taking samples for determining the acidity of the liquid. This charge lowered the pulp consistency from 12 to 8%. The pulp suspension was then heated for 20 minutes to a temperature of 90° C. This temperature was maintained for 180 minutes. Oxygen gas was introduced into the glass reactor at the end of this stage and during the subsequent cooling stage in a quantity such that the nitrogen monoxide (nitric oxide) present converted to nitric acid, practically quantitatively. This terminated activation of the pulp.

The spent liquor was then separated from the pulp by filtration, pressing and displacement with spent liquor from an earlier oxygen gas pulp bleaching process in which the pulp was activated in a similar manner. The following oxygen gas bleaching of the pulp was carried out at a pulp consistency of 8%, subsequent to adding 10% sodium hydroxide and 0.2% Mg (in the form of magnesium sulphate). The temperature was 106° C. and the partial pressure of the oxygen gas was 0.6 MPa, measured at a temperature of 25° C. The activated pulp had previously been divided into two mutually identical batches and were designated trials 1 and 2. Treatment was interrupted after a bleaching time of 20 and 40 minutes respectively, and the pulp was washed with water. The kappa number and intrinsic viscosity of the pulps were determined and the values obtained are set forth in Table 2 at the end part of this example.

The pulp taken three hours later than the aforesaid pulp had a kappa number of 33.1 and an intrinsic viscosity of 1199 dm$^3$/kg, which values are almost in agreement with the values of the first pulp.

Two reference trials were carried out in precisely the same manner as the two aforedescribed trials carried out in accordance with the invention, with the exception of the following. The acidity of the liquid accompanying the pulp was not determined. On the other hand, during the pulp activation process there was charged to the pulp the same waste liquor in the same quantities and the same amount of nitric acid at the same time point as in the trials 1 and 2 in accordance with the invention. Thus, no attempt was made in the reference trials to control the activation process on the basis of measured acidity values. The kappa number and intrinsic viscosity of these trial pulps were determined subsequent to completion of the oxygen gas bleaching process, the values obtained being set forth in Table 2.

Two trials were also carried out with this second pulp in accordance with the present invention. These trials, 3 and 4, were carried out in a manner fully identical with the afore-described trials 1 and 2. The acidity in this case was 16.2 mmols per liter of liquid. When interpolating the values set forth in Table 1, it was found that nitric acid should be added to the pulp in a quantity of 358 mols per 1000 kg pulp. This amount of acid was charged to the pulp and the continued treatment of the pulp was fully identical with the previously described treatment process. Upon completion of the oxygen gas bleaching process, the kappa number and intrinsic viscosity of these pulps were also determined, and the values obtained are set forth in Table 2 below.

TABLE 2

|  | Oxygen gas bleaching, time in minutes | Kappa number | Intrinsic viscosity $dm^3/kg$ |
|---|---|---|---|
| Trial 1 | 20 | 4.0 | 985 |
| Trial 2 | 40 | 3.2 | 940 |
| Reference 1 | 20 | 7.2 | 990 |
| Reference 2 | 40 | 5.0 | 945 |
| Trial 3 | 20 | 3.8 | 980 |
| Trial 4 | 40 | 3.1 | 940 |

As can be seen from the trials 1 and 2 one decreases the kappa number as low as 3.4 at an intrinsic viscosity of 950 $dm^3/kg$ at the treatment of the pulp according to the invention. This signifies that the lignin content of the pulp can be lowered by almost 90% when practicing the inventive method while maintaining acceptable pulp viscosity levels. It is important to note that this result has been obtained with a contaminated pulp, i.e. a pulp taken directly from the production line of a sulphate pulp mill and which has not been washed in the laboratory with the intention of reducing the amount of spent liquor solids present in the pulp. Furthermore, it should be noted that the far-reaching delignification of the pulp has been achieved in spite of the fact that the pulp consistency was as high as 8% during the terminal stage of the activation.

It was not possible to delignify the pulp to the same extent in the reference trials, which were not carried out in accordance with the invention, and the kappa numbers of these pulps were 2–3 units higher than the kappa numbers of the pulps treated in accordance with the invention compared at the same viscosity. Since the two pulps which were taken from the same production line at three hour intervals had equivalent kappa numbers and viscosity values, it would be thought that the end result would be the same in both instances, since precisely the same quantities of chemicals were introduced to the pulp during the activation and the activations were carried out in exactly the same manner. It should be remembered, however, that pulps which are taken from the production line at three hour intervals can differ from one another in at least two respects, namely with respect to the starting material from which the pulp was produced (the wood mix) and with respect to the amount of contaminating substance which accompanies the pulp to the activation and the proportion of said substances.

In other words, the activation must be adapted to the pulp entering the activation stage, by measuring the acidity of the liquid accompanying the pulp at a stage of the activation in which the initial reactions have declined and the regeneration reactions take place, and to base the addition of a liquid which contains mineral acid on the measured acidity value. This will enable the pulp to be activated to the result desired, irrespective of the aforesaid variations in the pulp entering the activation stage.

This is confirmed by the results obtained In trials 3 and 4 which were carried out in accordance with the invention on precisely the same pulp as that on which the reference runs 1 and 2 were based. The kappa numbers of the trial pulps 3 and 4 were also 2–3 units lower compared at the same viscosity.

EXAMPLE 2

A washed and screened sulphate pulp was taken from the previously mentioned production line. The pulp was thoroughly washed in the laboratory with deionized water, so as to remove from the pulp all organic substances deriving from the spent cooking liquor and the spent liquor from the oxygen gas bleaching. The pulp was then pressed and conditioned so as to obtain a pulp consistency of 50%. The pulp had a kappa number of 30.6 and an intrinsic viscosity of 1240 $dm^3/kg$.

Black liquor was taken from the same production line, this liquor constituting a mixture of genuine spent cooking liquor and spent oxygen gas bleaching liquor. That black liquor was diluted with water (1:4) and kneaded in to the pulp in a quantity corresponding to 220 kg undiluted black liquor per 1000 kg of dry pulp. The black liquor contained 192 g of dry substance, 39.8 g of sodium and 11.5 g of total sulphur per kg of undiluted liquor. The pulp consistency was therewith lowered to 34%. The pulp was then introduced into the glass reactor. The temperature was 40° C.

All these steps were taken in order to make it possible to determine the amount of contaminating substances carried to the activation stage and keep their amount at a constant level in a series of trials. Such carryovers of contaminated substances also occur in reality.

The glass reactor was evacuated and nitrogen dioxide was introduced in an amount of 20 kg (435 mol) per 1000 kg bone-dry pulp during a period of one minute. After a further 90 seconds had lapsed, the first portion of diluting liquid was introduced into the reactor, by suction. The diluting liquid had a temperature of 80° C. and contained 37.6 kg (597 mol) nitric acid, 244 kg of sodium nitrate and 7830 kg water, all calculated on 1000 kg bone-dry pulp. The amount of nitric acid included in the diluting liquid was based on previous experiences of activating and subsequently oxygen gas bleaching pulps of the same type and of approximately the same kappa number and with approximately the same admixture of black liquor estimated to contain the same proportions of constituents from spent cooking liquor and spent oxygen gas bleaching liquor. The amount of nitric acid was chosen at a much lower level than the level at which the best result could be anticipated with solely one addition of liquid containing nitric acid. After the dilution in the aforesaid manner, the pulp suspension was heated to 80° C. over a period of 12 minutes.

When the time derivative of the nitrate concentration, expressed in millimols per liter of liquid per minute, had been brought to a level beneath zero, a sample of the liquid were taken and the acidity was established by potentiometric titration with a sodium hydroxide solution to pH 3.5. The sample was taken one minute after completion of the aforesaid dilution. The liquid had a pH of 1.54 and the titration showed an acidity of 34.3 mmol per liter of liquid, which according to a regression relationship similar to that in Table 1 indicated a recommended charge (set point value) of 8.7 kg nitric acid per 1000 kg of bone-dry pulp. This charge was lower than the amount of nitric acid which gives an optimum result with only two dilutions. This amount of nitric acid, in the form of refreshened activation spent liquor corresponding to a total charge of 622 kg liquid was added to the pulp when the temperature of 80° C. was reached. This temperature was held constant for 5 minutes, whereafter the temperature was raised to 90° C. over a time period of 13 minutes.

Samples of liquid were taken one minute after completion of the aforesaid dilution. The pH of the liquid was 1.45 and the acidity, determined in the aforesaid manner, was 40.2 mmol per liter of liquid. According to a further regression relationship, similar to that disclosed in Table 1, 10.1 kg of nitric acid should be charged to the pulp. This charge was made by introducing 933 kg of freshened activation waste liquor to the pulp. This diluting liquid was introduced into the glass reactor when the temperature of 90° C. was reached.

As an additional check of the activation process, a sample of liquid was taken one minute after the last-mentioned diluting liquid had been added to the pulp. The pH was then 1.48 and the acidity 39.8 mmol per liter of liquid. According to earlier experience these measurement values indicated that no further nitric acid should be added and that no other adjustments of the process variables, for instance the temperature, should be made.

The temperature of 90° C. was maintained during the various trials over periods of 20, 60, 120 and 180 minutes. At these time points, the glass reactor was cooled rapidly, so that the activation process practically ceased. This terminated the activation of the pulp in the different trials.

The spent liquor was then extracted from the pulp by filtration, pressing and displacement with spent liquor from a previous oxygen gas bleaching process, of pulp activated in a similar manner. The following oxygen gas bleaching of the pulp was carried out at a pulp consistency of 26%, after adding 1.5% sodium hydroxide and 0.2% Mg (in the form of magnesium sulphate). The oxygen gas pressure was 0.4 MPa. The temperature was 106° C. and the time 60 minutes. Subsequent to the oxygen gas bleaching the pulp was washed with water and the kappa numbers and intrinsic viscosities of the pulps were determined and are set forth in the following Table 3.

With the intention of establishing the effect of the actual activation of the pulp, analyses were also carried out on pulp which had solely been activated, these samples being washed rapidly with a 0.2 molar sodium hydrogencarbonate solution at a temperature of 22° C. under standardized conditions.

All of the aforesaid trials were carried out in accordance with the invention and constitute examples of the inventive embodiment in which two acidity measurements were carried out and used as the basis for two subsequent additions of liquid containing mineral acid to the pulp.

A reference experiment was carried out with the same pulp with the same black liquor addition. The same chemical charges and the same temperature schedule were used as those used in the trials carried out in accordance with the invention. The reference run differed from the other trials insomuch as all the additions of the nitric acid and sodium nitrate dissolved in the spent activation liquor were added to the pulp prior to introducing nitrogen dioxide. The pulp was then maintained at a constant consistency of 12% during the whole activation process. As will be understood, no liquid samples were taken for the purpose of determining acidity.

TABLE 3

| Activation time at 90° C. | Activated pulp washed with sodium hydrogencarbonate | | Oxygen gas bleached pulp | |
|---|---|---|---|---|
| minutes | kappa no. | intr. visc. | kappa no. | intr. visc. |
| Reference = 120 | 23.3 | 995 | 12.2 | 940 |
| Trial 1 = 20 | 22.8 | 1120 | 10.7 | 1128 |
| Trial 2 = 60 | 18.2 | 1097 | 7.6 | 1095 |
| Trial 3 = 120 | 12.2 | 1021 | 4.4 | 1007 |
| Trial 4 = 180 | 11.0 | 1002 | 3.5 | 952 |

When the reference is compared with trial 3, with the same activation time at maximum temperature, it is found that the pulp treated in accordance with the invention has a lignin content which is only one third of that of the reference pulp. Despite this the pulp treated in accordance with the invention had a markedly higher viscosity. It should be noted that in both instances, the pulps were supplied with the same chemicals in the same quantities and that the same temperature schedule was used during the activation.

The explanation to this surprising difference in results is that the method according to the invention is based on the fact that a large number of complicated and partially mutually competitive chemical reactions take place when cellulose pulp which includes additions of the aforedescribed chemicals is activated. Certain of the reactions are harmful to the pulp whereas certain others (probably the majority) are beneficial. Consequently, it is advantageous to minimize the harmful reactions and to optimize the beneficial reactions. This can be achieved by dividing the activation into an initial stage and a final stage. The invention enables it to be ascertained when the initial stage approaches its termination and the regenerating reactions begin to dominate. Furthermore, the invention enables optimization of the effect of the regeneration reactions and the consecutive reactions resulting from the regeneration. The whole of the activation process is essentially optimized in this way.

The results of trials 1–4 recited in the above table also illustrate the benefit obtained when employing a relatively high temperature and, above all, a relatively long time period during the regenerating stage of the activation. As will be seen, it is possible to control the activation with the aid of time, and therewith also the final delignification of the pulp to the level desired. The time period of 180 minutes at a temperature of 90° C. results in a pulp kappa number as low as 3.5 at the acceptable viscosity level of 950 dm$^3$/kg.

As can be seen from the above described working examples, it is possible when practicing the invention to lower the lignin content of technical cellulose pulp down to a level of kappa numbers of 3–4. This means that these pulps can be finally bleached to a brightness of 90 according to ISO with moderate charges of other bleaching chemicals. The bleaching agent chlorine need not be used while the continued and final bleaching of the pulp can, for instance, be carried out in the following three stages with the aid of the following chemicals:

1. Chlorine dioxide ($ClO_2$).
2. Alkali reinforced with oxygen gas and/or peroxide (NaOH+O/P).
3. Chlorine dioxide ($ClO_2$).

Consequently, the amount of organically bound chlorine released to the recipient will be low.

If desired, final bleaching of the pulp can be excluded and, of course, final bleaching of the pulp can be carried out with bleaching chemicals other than those exemplified above and in a different sequence.

I claim:

1. A method for controlling activation of a lignocellulosic material in the presence of a nitrate containing liquid to allow efficient subsequent delignification thereof, comprising:

(a) activating said lignocellulosic material with a gas containing nitrogen dioxide ($NO_2$), (b) during an initial stage of said activating step with its initial chemical reactions taking at least one measurement of acidity of the liquid at a time subsequent to a time when a change in the nitrate content of the liquid over time is +0.2 mmol per liter of liquid per minute or less, (c) after it is determined that a change in the nitrate content of the liquid over time is +0.2 mmol per liter of liquid per minute or less, supplying mineral acid to the lignocellulosic material in a controlled and whole amount, said controlled and whole amount being determined with reference to said measured acidity (c) after supplying the mineral acid to the lignocellulosic material in a controlled and whole amount, continuing the activation of the lignocelluosic material to termination; and (e) subjecting the thus activated lignocellulosic material to alkaline delignification.

2. The method according to claim 1, wherein the change in the nitrate concentration over time is determined by determining the nitrate content of the liquid during an early stage of the activation at selected time intervals by using ion chromatography.

3. The method according to claim 1 or 2, comprising determining the controlled amount of mineral acid using a regression relationship between the amount of mineral acid and the measured acidity value.

4. The method according to claim 3, wherein steps (a)–(c) use parameters comprising charge of nitrogen dioxide or equivalent chemicals, time and temperature schedule, and apparatus which are the same as, and lignocellulosic material similar to, parameters and lignocellulosic material used in the trial to develop the regression relationship from which the controlled amount of mineral acid is determined.

5. The method according to claim 3, comprising:

supplying only a part of said amount of mineral acid to said lignocellulosic material, subsequently determining the acidity value at selected time intervals, correspondingly determining an additional amount of mineral acid necessary for continuation and termination of the activation from the regression relationship, and supplying said additional amount of mineral acid to the lignocellulosic material.

6. The method according to claim 5, wherein said part of said amount of mineral acid is 60–90% of said amount of mineral acid.

7. The method according to claim 6, wherein the mineral acid supplied to the lignocellulosic material is in the form of a prioress extrinsic acid and/or in the form of nitric acid contained in waste liquor obtained from a previous lignocellulosic material activating process.

8. The method according to claim 1 or 2, wherein the mineral acid is nitric acid or the mineral acid contains nitric acid as its main component.

9. The method according to claim 1 or 2, comprising raising the temperature during the activation to at least 70° C., over a time period of at least 60 minutes.

10. The method according to claim 1 or 2, comprising introducing oxygen gas during the latter half of the activation.

11. The method according to claim 1 or 2, comprising determining the nitrate content of the liquid within an activation reactor.

12. The method according to claim 1 or 2, comprising determining the nitrate content of the liquid from liquid taken from an activation reactor.

* * * * *